UNITED STATES PATENT OFFICE.

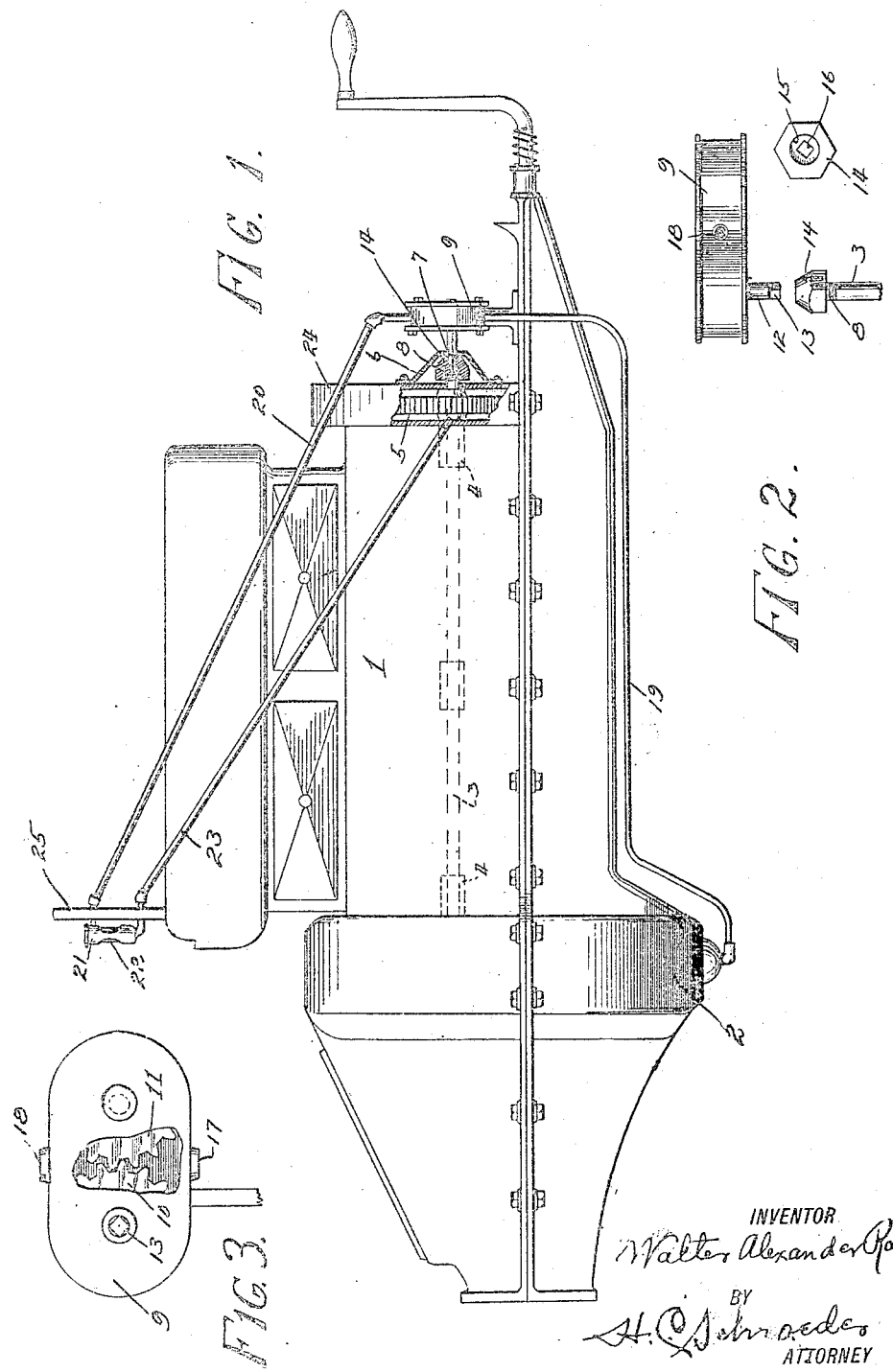

WALTER ALEXANDER RARIG, OF OAKLAND, CALIFORNIA.

OILING SYSTEM.

1,288,189.

Specification of Letters Patent.  Patented Dec. 17, 1918.

Application filed May 24, 1916. Serial No. 99,515.

*To all whom it may concern:*

Be it known that I, WALTER ALEXANDER RARIG, a citizen of the United States, residing at Oakland, in the county of Alameda and State of California, have invented certain new and useful Improvements in Oiling Systems, of which the following is a specification.

This invention relates to improvements in oiling systems for internal combustion engines, and more particularly to a system adapted to be attached to those engines which at the present time are oiled by what is commonly known as the splash system.

The principal object of my invention is to arrange mechanical devices whereby oil is taken from the sump, forced through a sight feed pipe and then delivered at one or more suitable points in the crank casing where it is most effectively distributed to the various moving parts.

Another object of my invention is to provide an improved means for attaching the pump to a moving part of the engine and in general to provide a simple and efficient system for the purpose set forth.

With these and other objects in view my invention consists in the novel construction and combination and arrangement of parts herein illustrated and more specifically pointed out in the appended claims.

Referring to the accompanying drawings forming a part of specification,

Figure 1 is a view in side elevation showing my improved oiling system attached to an automobile engine, Fig. 2 is a view in plan showing the manner in which the pump is attached to the cam shaft of the engine, and also showing the inside of the attaching nut, Fig. 3 is a view in front elevation of the gear pump used in connection with the oiling system.

Referring to corresponding parts of the several views by the same numerals of reference, 1 denotes the engine casing, 2 the oil sump or reservoir, 3 the cam shaft, pivotally mounted in bearings 4 and which is driven by the gear 5 from the crank shaft of the engine. Casing 6 surrounds the end of the cam shaft and when installing my improved system, I provide an opening 7 through the end of this casing and thread the end of the cam shaft, as shown at 8. The oil pump is denoted by 9, and I preferably use a gear pump as shown in Fig. 3, as this secures a more positive circulation of oil than a rotary pump of the centrifugal type. The pump comprises the toothed gears 10 and 11 revolubly mounted in a suitable casing which is provided with intake 17 and outlet 18. The shaft 12 on which gear 10 is mounted has an extension, the end of which is formed square or rectangular, as shown at 13. The shaft 12 is driven from the cam shaft by means of a nut 14 which is in threaded engagement with the end of the cam shaft provided with the recess 15 and hole 16 of the same shape as the end of the pump shaft.

A pipe 19 extends from the sump to the intake opening 17 of the pump and from the exit opening 18 a pipe 20 extends to some point on the dashboard 25. On the driver's side of the latter is positioned a sight feed device 21 having a transparent glass 22 through which the flow of oil may be noted from time to time. From the lower connection of the sight feed device a pipe 23 extends to the gear casing 24, which incloses the gear 5; thus in operation as long as the engine is running the pump draws oil from the sump through the pipe 19 and forces it upwardly through pipe 20 into the sight feed device 21. From the latter it flows through pipe 23 to the gear casing, causing a constant stream to be ejected into the teeth of the gear. The surplus oil from the gear flows downwardly to the bottom of the engine casing and along the latter to the sump, and as it flows along the gear casing, the heads of the connecting rods dip into the oil thereby effectively lubricating the connecting rods and cylinder walls.

While I have shown the preferred embodiment of my invention it may be understood that changes may be made in minor details and features of design within the scope of the claims without departing from the essential features of the invention.

I claim as new and wish to cover by Letters Patent:—

1. The combination with the crank casing of an internal combustion engine, and a cam shaft having one end projecting from said casing, of a rotary pump supported independently of the crank casing, means for connecting said casing with the projecting end of said cam shaft, and an oil reservoir in communication with said pump.

2. The combination with a crank casing of an internal combustion engine, and a cam shaft having one end projecting from said casing, of a rotary pump supported independently of the crank casing having a short shaft, means for detachably connecting one end of said short shaft with the projecting end of the cam shaft, and an oil reservoir in communication with said pump.

3. The combination with a crank shaft of an internal combustion engine, said shaft having a threaded end, of a rotary pump provided with a short shaft, a coupling member working on the threaded end of said crank shaft and having means for engaging the pump shaft, and an oil reservoir in communication with said pump.

4. The combination with a crank shaft, of an internal combustion engine, said shaft having a threaded end, of a rotary pump provided with a short shaft having one end provided with an angular portion, a coupling nut engaging the threaded end of the crank shaft and having an angular socket to receive the end of the pump shaft, and an oil reservoir in communication with said pump.

In testimony whereof I affix my signature.

WALTER ALEXANDER RARIG.